May 25, 1926.
A. G. HARMS
METHOD OF AND APPARATUS FOR HEATING CORROSIVE CHEMICALS
Filed Sept. 27, 1923
1,585,671
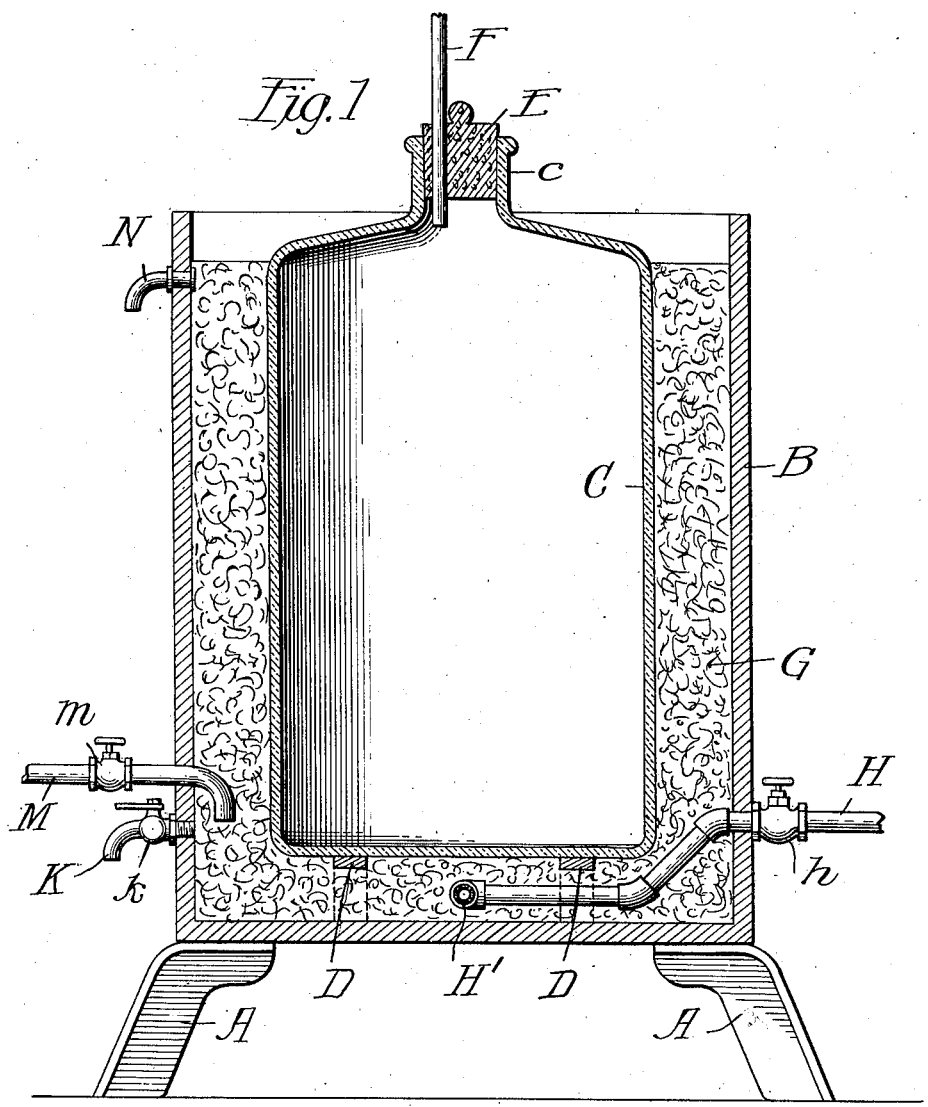
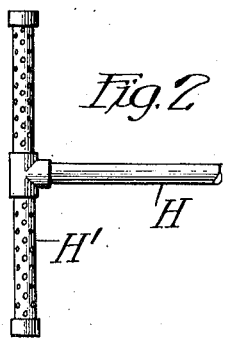
Inventor:
Albert G. Harms,
By Fisher, Towle, Clapp & Soans.
Attys.

Patented May 25, 1926.

1,585,671

UNITED STATES PATENT OFFICE.

ALBERT G. HARMS, OF CHICAGO, ILLINOIS.

METHOD OF AND APPARATUS FOR HEATING CORROSIVE CHEMICALS.

Application filed September 27, 1923. Serial No. 665,072.

While my invention is obviously susceptible of wide application, it has been found in practice particularly well adapted for use in the manufacture of crude quinaldine oil, and this use of the invention will therefore be hereinafter referred to as illustrative in setting forth the characteristics and advantages of the invention.

In the manufacture of crude quinaldine oil to be used in the production of dyes, it has been heretofore proposed to employ an apparatus comprising an enamel lined kettle enclosed within a steam-tight metal jacket. Ordinarily, in the use of such apparatus, about 93 lbs. of aniline oil was placed in the kettle and to this was added about 250 lbs. of hydrochloric acid, the action of the acid upon the oil causing the temperature of the mixture to rapidly rise to approximately 100° C. After allowing the mixture to cool to about 40° C., there was then added thereto about 243 lbs. of paraldehyde. This addition of the paraldehyde caused the temperature of the mass within the kettle to rapidly come to boiling point, i. e., about 110° C., and to continue to boil for about three minutes. As soon as boiling subsided steam at boiler pressure (say 40 lbs. pressure) was admitted to the jacket surrounding the kettle to maintain the contents of the kettle at about 110° C. for a period of about five hours. The crude quinaldine oil resulting from the above process was then drawn from the kettle and subjected to further treatment.

In practice a number of serious objections exist to the use of the apparatus heretofore employed in the manufacture of crude quinaldine oil. The enamel lined kettle with its air-tight steam jacket not only entails a large initial cost, but it is found that there is danger of cracks or imperfections occurring in the enamel lining of the kettle which permit the acid to attack and speedily corrode the kettle thereby rendering it unfit for use. Again in practice it is found that the acid is apt to spatter on the steam jacket causing weak spots to develop therein and thus rendering the jacket unsafe under steam pressure to which it is subjected. These and other objections have led to the present invention which provides not only a much cheaper and simpler apparatus, but also insures a substantial economy and efficiency in the heating of the contents of the kettle.

In the drawings:

Fig. 1 is a view in central vertical section through an apparatus embodying my invention;

Fig. 2 is a detail plan view showing the perforated end portion of the steam admission pipe adjacent the bottom of the apparatus.

Upon suitable supports A is mounted a jacket or tub B that may be of cylindrical or other suitable shape, and preferably of wood or other material that will not be seriously affected by the action of acid or other corrosive chemicals. Within this jacket or tub B is mounted the kettle or container C, suitable strips D of wood or like material being interposed between the bottom of the kettle C and the bottom of the jacket B to support the kettle above the bottom of the jacket. The kettle C is formed of stoneware, glass, or other acid-proof or vitreous material, and the top c of the kettle is provided with a stopple E that may consist of lead. This stopple has a hole extending vertically therethrough to receive the lower end of a reflux condenser pipe F. I have not deemed it necessary to illustrate the details of this reflux condenser pipe as it is of well-known character.

The diameter of the kettle C is materially less than the interior diameter of the jacket or tub B so as to afford a space around the kettle that will be filled with a packing G of comminuted or porous material such as excelsior, waste, or the like, which will be packed not only around the sides of the kettle C, but also between the bottom of the kettle and the bottom of the jacket or tub B.

At a slight distance above the bottom of the jacket B there is formed a hole to admit the steam pipe H that should be provided with a suitable cock $h$; and this steam pipe H is preferably extended down beneath the bottom of the kettle C and is provided with a perforated part H′ through which steam may be discharged. Adjacent but preferably at a slight distance above the bottom of the steam jacket is fitted a drain pipe K whereby water may be drained from the jacket when required, this drain pipe being provided with a stop-cock $k$. Through the wall of the jacket B also extends a pipe M to admit water to the space between the kettle C and the jacket B, this water pipe M being provided with a cock $m$ and being preferably located at about the position shown in the drawing. Near the top of the jacket B is fitted an overflow pipe N through which water may be carried away by a suitable hose, not shown.

The drawing illustrates a single kettle with its enclosing jacket, but it will be readily understood that for certain uses there will be a battery or group of kettles or jackets of like structure.

In the practice of my invention, for example in the manufacture of crude quinaldine oil, the aniline oil will be placed in the kettle and the hydrochloric acid added, as in the process hereinbefore described. The mixture will be allowed to cool to about 40° C., this cooling being expedited, if desired, by the admission of water to the jacket B through the pipe M. There will then be added the proper proportion of paraldehyde, and the mixture will be permitted to boil for approximately three minutes. When this boiling, incident to the addition of the paraldehyde, has subsided, steam at boiler pressure (say 40 lbs. pressure) will be admitted to the jacket B through the steam pipe H and the steam will continue to be thus admitted for a period of about five hours. As the steam is thus admitted under boiler pressure to the jacket, it will convert into steam the water in the lower part of the jacket and, in practice, it is found that although the steam escapes freely at the top of the jacket and around the kettle, the heat of the steam under boiler pressure of about 40 lbs. is found sufficient to maintain the contents of the kettle at a temperature of about 110° C. The resistance offered to the upward passage of the steam by the comminuted or porous packing prevents the rapid lowering of the pressure and temperature of the steam about the lower portion of the kettle and thus enables the steam before its escape from the jacket to maintain the contents of the kettle at a materially higher temperature than the temperature of steam at atmospheric pressure.

My improved apparatus presents numerous features of advantage over apparatus heretofore employed for like purposes. Thus, for example, by forming the kettle of stoneware or equivalent material it is rendered proof against the corrosive action of the chemicals, and by forming the jacket of wood or equivalent material, the action of corrosive chemicals thereon is negligible. By employing a jacket with an open top with the kettle removably mounted therein, I am enabled to conveniently remove the kettle for replacement, cleaning or other purposes; and the simplicity of the apparatus and cheapness of the materials from which it is formed, renders the initial cost very small. The use of the packing of excelsior or other comminuted or porous material, avoids the necessity of employing a steam-tight jacket, since as has been stated, the effect of the packing between the kettle and the wall of the jacket enables when desired, a temperature materially higher than the boiling point of water to be maintained within the jacket notwithstanding the fact that the top of the jacket is open. So also the excelsior or like packing serves to evenly distribute the heat about the bottom of the kettle.

I claim as my invention:

1. The method of heating corrosive chemicals that consists in exposing said chemicals in a container in juxtaposition to a mass of comminuted material and passing steam through said material.

2. The method of heating corrosive chemicals that consists in exposing said chemicals in a receptacle surrounded by a mass of comminuted porous material and admitting steam at one point of said material and permitting it to escape freely at an opposite point thereof.

3. An apparatus of the character described comprising a vitreous receptacle for containing the material to be heated, a jacket surrounding said receptacle, a mass of comminuted porous material interposed between said receptacle and said jacket, and means for passing steam through said comminuted material.

4. An apparatus of the character described comprising a kettle of stoneware, a jacket of wood surrounding said kettle, a pipe whereby steam is admitted to said jacket at the bottom thereof, fibrous material filling the space between the kettle and the jacket, the space between the kettle and the jacket being open to permit the escape of steam at the top of the jacket.

5. An apparatus of the character described, comprising a container of vitreous material, means for sealing the container except at the point of admission of the chemicals thereto, a jacket of acid or corrosive resisting material surrounding said container in spaced relation thereto at the sides and bottom, supports across the jacket spaced from the bottom thereof to sustain the container, a mass of fibrous porous material packed in the space between the container and jacket at the sides and bottom, means for admitting water to said space for cooling purposes, and means for admitting steam to said space between the bottom of the container and the jacket for heating purposes and adapted to convert the water in the lower part of the jacket into steam, the space between the container and the jacket being freely open at the top to permit the escape of steam.

6. An apparatus for heating corrosive chemicals, comprising a container of vitreous material, means for sealing the container except at the point of admission of the chemicals thereto, a jacket of corrosive chemical resisting material surrounding said container in spaced relation thereto at the sides and bottom, fibrous material in the space between the container and the jacket, means for admitting a cooling medium to said space, and means for admitting a heating medium to said space between the container and the jacket, the space between the container and the jacket being freely open at the top.

7. An apparatus for heating corrosive chemicals, comprising a container of vitreous material, means for sealing the container except at the point of admission of the chemicals thereto, a jacket of corrosive chemical resisting material surrounding said container in spaced relation thereto at the sides and bottom and having a steam escape opening, fibrous material in the space between the container and the jacket, means for admitting water to said space, and means for admitting steam to said space to convert the water in the lower part of the jacket into steam for escape through the opening.

ALBERT G. HARMS.